United States Patent Office 3,549,577
Patented Dec. 22, 1970

3,549,577
WATER-SOLUBLE, POLYESTER RESIN BASE, BAKING VEHICLE AND PROCESS OF PREPARING SAME
Sanford E. Stromberg, Tonawanda, N.Y., assignor to Textron Inc., a corporation of Delaware
No Drawing. Filed Jan. 6, 1967, Ser. No. 607,629
Int. Cl. C08g 37/34, 51/24
U.S. Cl. 260—29.4                                26 Claims

ABSTRACT OF THE DISCLOSURE

Polyester resin base, aqueous baking vehicles are prepared by heating an aqueous polyester prepolymer solution (pH=5.5 to 6.5), containing an alkylated polymethylol melamine, at about 105 to 140° F. for time sufficient to make fast-curing but not so long as to cause gelation, for instance, 15 to 60 minutes. After the "cooking in" of the melamine cross-linking agent, the pH of the product is adjusted to about 7 to 10.

---

This invention relates to water-soluble, polyester resin base baking vehicles and to their method of preparation. More particularly, the invention is directed to water-soluble baking vehicles which are fast-curing at relatively low temperatures, the vehicles being prepared by partially pre-curing in an aqueous medium a polyester prepolymer with an alkylated polymethylol melamine cross-linking agent.

Water dispersible (WD) baking vehicles which employ a polyester prepolymer in conjunction with an etherified melamine-formaldehyde reaction product as a cross-linking agent are known in the art. Heretofore, these baking vehicles have generally exhibited relatively lengthy, severe curing schedules, for instance, in the neighborhood of 30 minutes at 300 to 350° F. The desirability of vehicles providing coating compositions which can be baked to hardness in shorter times or at lower temperatures, or both, yet which remain storage stable, is readily apparent.

It has now been found that water-soluble, polyester resin base baking vehicles prepared by the method of the present invention possess the elusive combination of low severity curability and excellent storage stability, i.e., long shelf life. The primary advantage of this invention is the flexibility of curing schedules of the vehicles. They will cure at rates ranging, for instance, from 2 minutes at 350° F. to 10 minutes at 180° F., a temperature below the boiling point of water. No flash-off time is needed during curing and the resultant films exhibit excellent hardness, flexibility, adhesion and chemical resistance. Insoluble, water-insensitive films are also obtained, even though the starting vehicles are water-soluble. In addition, the final vehicles can be processed to non-volatile (NV) contents which are uncommonly high for water systems; for instance, the products of this invention can be made at 65% NV at a very workable viscosity. Excellent color and color stability are also found with both the vehicles and the cured films therefrom. Besides these advantages, the vehicles prepared are, as mentioned, of the water-soluble type. This in itself is an asset, for the use of water as a solvent renders the products non-flammable, non-toxic, odorless and relatively inexpensive.

The baking vehicles of the present invention are prepared by a process which embodies important features regarding time, temperature, pH and reactants and their order of addition. The process comprises the following steps:

(i) Preparation of an aqueous solution of a polyester prepolymer having an AV (acid number) of about 30 to 70, preferably about 40 to 60, and a hydroxyl number of about 75 to 180, preferably about 100 to 160, and a basic nitrogen compound capable of forming a water-soluble soap with said prepolymer, the basicity and amount of the nitrogen compound being sufficient to adjust the pH of the solution to at least about 5.5, preferably at least about 6, up to about 6.5;

(ii) Reaction of said polyester prepolymer aqueous solution with cross-linking amounts of an alkylated polymethylol melamine at a temperature of about 105 to 140° F., preferably about 115 to 130° F., for a time sufficient to develop the desired fast-curing properties, which may be at least about 15 minutes, preferably about 25 to 45 or 60 minutes; and (iii) Adjustment of the pH of the reaction product solution of (ii) to a value of about 7 to 10, preferably about 8 to 9, by the addition of a basic nitrogen compound capable of forming a water-soluble soap with said reaction product.

As stated previously, the conditions outlined in the above process are important for the attainment of water-solubility, fast-curing properties, and storage stability. Prior attempts to achieve these properties in a polyester resin baking vehicle have left much to be desired. Thus, previous techniques of preparing baking vehicles, in order to preserve storage stability, have postponed the addition of melamine cross-linking agent until the aqueous solution of polyester prepolymer has cooled to room temperature; stability is thus achieved at the sacrifice of rapid curability. Other formulation techniques have involved the addition of the melamine cross-linking agent at elevated temperatures but without regard to holding times or pH control, and the resultant vehicles, while sometimes capable of fast-curing, were markedly inferior as regards water solubility or storage stability, or both.

Polyester prepolymers suitable for use in preparing the baking vehicles of the present invention are well known condensation products of polycarboxylic acids, for instance, of about 4 to 24 carbon atoms, or their anhydrides, and polyhydric alcohols, such as those of about 2 to 12 carbon atoms. As suitable polybasic acids may be mentioned, for example, aromatic acids such as trimellitic acid and phthalic acid and aliphatic acids, either saturated or unsaturated, such as adipic acid, azelaic acid, maleic acid, adducts of maleic acid with fatty oils or fatty oil acids such as, for example, maleinized soybean oil, maleinized tall oil acids, etc. Suitable polyhydric alcohols include, for example, neopentyl glycol, trimethylol propane, trimethylol ethane, 1,3-butane diol, glycerol, pentaerythritol, etc.

In addition to the essential ingredients, i.e., the polybasic acid and the polyol, there are often included in the polyesters modifying amounts of other condensable materials such as drying oils, monocarboxylic fatty and aromatic acids, e.g. 2-ethylhexanoic acid, pelargonic acid, benzoic acid, etc.; hydroxy acids such as dimethylol propionic acid; and monohydric alcohols, for example, those which serve as organic coupling agents, such as n-propanol, n-butanol, butyl Cellosolve, butyl Carbitol, etc. These organic coupling agents are often added subsequent to prepolymer formation; their presence in minor amounts in the final baking vehicle has been found to enhance significantly the storage stability of the composition. Other modifying ingredients include fatty oils, both saturated and unsaturated, to yield non-oxidizing or oxidizing alkyd resins, ethylenically unsaturated monomers such as styrene, etc.

Methods of preparing these conventional low molecular weight polyester prepolymers are well known in the art. By way of illustration, the polybasic acid and a portion of the polyol can first be reacted in a monohydric alcohol solution, for instance, at a temperature of about 300 to 400° F., followed by addition of monobasic acid and remainder of polyol and continued heating until appropriate acid and hydroxyl numbers are achieved. The alcohol solvent functions both as a reactant and as an azeotroping agent to carry off the water of esterification.

In order to provide sufficient available hydroxyl and carzoxylic sites in the prepolymer, it is often preferred that at least about 50 wt. percent of the total polybasic acid component be supplied by acids having 3 or more, say up to about 5, carboxylic acid groups, and that at least about 40 wt. percent of the total polyol component be provided by polyols having 3 or more, say up to about 6, hydroxyl groups. The prepolymer may often have a calculated molecular weight of about 300 to 3000, preferably about 900 to 1500.

Water-solubilization of the polyester prepolymer (step (i)) is achieved by partial neutralization of the unreacted carboxyl groups with a soap-forming nitrogen compound. Suitable basic nitrogen compounds include ammonia and volatile amines and may often have a molecular weight of less than about 150. Especially suitable are tertiary amine, etc. The neutralization can be effected by simply ethanol amine, diethyl ethanol amine, methyl diethanol amine, etc. The neutralization can be effected by simply admixing in an aqueous medium the polyester prepolymer and the nitrogenous base; preferred proportions are a major amount, say about 70 to 80 parts by weight, of prepolymer, a minor amount, such as about 30 to 20 parts by weight, of water (these amounts are based on prepolymer plus $H_2O$) and sufficient nitrogenous base to adjust the pH of the solution to about 5.5 to 6.5. The neutralization temperature may vary as desired; the neutralization may be effected, for example, at temperatures anywhere from about 160 to 220° F.

Reaction of the prepolymer solution with alkylated polymethylol melamine (step (ii)) can be conducted by combining the melamine cross-linking agent and the acidic polyester solution and, as mentioned above, heating at about 105 to 140° F. for, for instance, about 30 to 60 minutes. Often after the reaction, the solution has a viscosity greater than about 1000 strokes, based on a 74% solids content. When additional nitrogenous base (see step (iii)) and coupling solvents are added, the percent solids content and viscosity will be reduced. The alkylated polymethlol melamine can be added to the prepolymer solution in cross-linking amounts, often about 5 to 40, preferably about 15 to 30, wt. percent, based on polyester prepolymer solids.

Alkylated polymethylol melamines are well known, commercially available, polyester resin cross-linking agents prepared by reaction of melamine with greater than equimolar quantities of formaldehyde to form a polymethylol melamine, followed by etherification with an alkanol to yield a poly (alkoxymethyl) melamine. Suitable such melamine cross-linking agents for use in the present invention include those containing an average of about 2 to 6, preferably about 3 to 6, total alkoxymethyl groups and methylol groups per molecular proportion of melamine, with the alkoxymethyl groups preferably predominating. The alkoxy groups preferably have 1 to about 4 carbon atoms. Most advantageously, the alkylated polymethylol melamine used in preparing the baking vehicle of the present invention will be sufficiently water-soluble that it can be essentially completely dissolved in the aqueous polyester prepolymer solution at the cross-linking reaction temperatures, i.e., at about 105 to 150° F.

The present method of adding the melamine cross-linking agent to an acidic polyester prepolymer solution is a significant departure from prior methods which rendered the prepolymer solution neutral or alkaline, usually adjusting to a pH of about 8, prior to addition of the melamine derivative. The present method results in a much faster curing schedule for the finished vehicle; even when baking temperatures as low as about 180° F. are employed, the vehicle of the present invention will cure in about 10 to 20 minutes. This represents a great improvement over baking vehicles prepared by the prior art method of cold addition of the cross-linking agent to an alkaline prepolymer solution, which vehicles usually require baking temperatures of at least about 275° F. in order to cure within 10 to 20 minutes, and often fail completely to develop a satisfactory cure at temperatures as low as 180° F. The holding time of about 30 to 60 minutes at the stated reaction temperatures is sufficient to develop the fast-curing characteristics of the baking vehicle of the present invention, but is not so long as to effect gelation. As a result of the cooking step, the pH of the solution is elevated somewhat to a value approaching neutrality, say within the range of about 6.5 to 6.8.

After the melamine cross-linking agent has been cooked into the prepolymer solution, the reaction product solution is adjusted to a pH of about 7 to 10, preferably about 8 to 9, (step (iii)) with additional nitrogenous base, if needed. To the resulting aqueous vehicle can be added pigments, dyes, viscosity reducers, organic coupling solvents, driers, curing catalysts, etc., as desired. The use of organic coupling solvents such as fatty alcohols, ether alcohols, polyether alcohols, etc., discussed earlier, is often advantageous to ensure water-solubility and extended shelf life. Curing catalyst, preferably acid esterification catalyst such as p-toluene sulfonic aicd and p-toluene sulfonamide, is also useful in further reducing time and temperature baking requirements. Minor amounts of surfacants (anionic, cationic, or non-ionic) such as acetylenic glycols, may also be used to aid film properties, for example, to retard cratering and pinholing in the cured films.

The following examples will serve to illustrate the present invention but should not be considered limiting.

EXAMPLE I

Charge

| | G. |
|---|---|
| Trimellitic anhydride (TMA) | 440 |
| Neopentyl glycol (NPG) | 594 |
| Adipic acid | 334 |
| n-Butanol (BuOH) | 96 |
| Dimethyl ethanol amine (DMEA) | 118 |
| Water | 433 |
| Cymel 7273–7, (Commercial alkylated polymethylol melamine, 80% soln. in water) | 394 |
| Butyl Carbitol | 218 |
| Surfynol PC (Commercial blend of an acetylenic glycol with other surface-active agents) | 47 |
| p-Toluene sulfonic acid (p-TSA) (5% solution in water) | 50 |

Procedure

Charge TMA, n-BuOH, and 40% of the NPG and heat to 320°–325° F. Hold for approximately 1½–2 hours (AV=150–160). Add adipic acid and the rest of the NPG and heat to 370° F. Hold for AV of 55±2 (approximately 4 hours). Cool to 200° F. and add the water and 75% of the DMEA. Cool to 140° F. and add the aqueous solution of alkylated polymethylol melamine. Hold at 120–130° F. for 30 minutes. At the end of this time, add the remainder of the DMEA and all of the butyl Carbitol. Cool to room temperature and add the Surfynol PC and p-TSA. Product analysis:

| | |
|---|---|
| NV | 65.8 |
| AV (mg.KOH/g.) | 26.7 |
| pH | 8.89 |
| GC (Gardner color) | 1 |
| Viscosity | Z4 |

Cure schedules of 2 minutes at 350° F. and 5 minutes at 240° F. can be obtained with this vehicle.

EXAMPLE II

Charge

| | G. |
|---|---|
| Trimellitic anhydride | 440 |
| Neopentyl glycol | 594 |
| Adipic acid | 334 |
| n-Butanol | 96 |
| Dimethyl ethanol amine | 118 |
| Water | 433 |
| Cymel 7273-7 | 394 |
| n-Propanol | 218 |
| Surfynol PC | 47 |
| p-Toluene sulfonic acid (5% solution in water) | 50 |

Procedure

Same as for Example I, except that after the alkylated polymethylol melamine is added, the temperature is held at 120-130° F. for 45 minutes. Propanol is substituted for butyl Carbitol as the organic coupling solvent. Product analysis:

| | |
|---|---|
| NV | 63.7 |
| AV | 28.2 |
| pH | 8.54 |
| GC | 1 |
| Viscosity | Y+ |

A cure schedule of 10 minutes at 180° F. can be obtained with this vehicle.

EXAMPLE III

Charge

| | G. |
|---|---|
| Phthalic anhydride (PA) | 452 |
| Trimethylol ethane (TME) | 300 |
| 2-ethyl hexoic acid (2- et hex) | 201 |
| Pelargonic acid | 134 |
| Dimethylol propionic acid (DMPA) | 154 |
| Dimethyl ethanol amine | 112 |
| Water | 378 |
| Cymel 7273-7 | 350 |
| Resimene RF-5307 Commercial butylate polymethylol melamine, 50% soln. in isopropanol) | 86 |
| Butyl Carbitol | 193 |
| Surfynol PC | 40 |
| p-Toluene sulfonic acid (5% solution in water) | 43 |

Procedure

Charge PA, TME, 2-et hex, pelargonic acid and DMPA and heat to 390° F. Hold for AV of 56-58 (approximately 5 hours). Cool to 200° F. and add the water and 75% of the DMEA. Cool to 140° F. and add the Cymel and Resimene. Hold for 30 minutes. At the end of this time, add the remainder of the DMEA and the butyl Carbitol. Cool to room temperature and add the Surfynol PC and p-TEA. Product analysis:

| | |
|---|---|
| NV | 65.3 |
| AV | 29.4 |
| pH | 8.77 |
| GC | 1 |
| Viscosity | Z2— |

EXAMPLE IV

Charge

| | G. |
|---|---|
| Trimellitic anhydride | 440 |
| Neopentyl glycol | 594 |
| Adipic acid | 334 |
| n-Butanol | 96 |
| Dimethyl ethanol amine | 118 |
| Water | 508 |
| Cymel 350 (Commercial methylated polymethylol melamine, by IR analysis: hexamethoxymethyl melamine) | 315 |
| n-Propanol | 218 |
| Surfynol PC | 47 |
| p-Toluene sulfonic acid (5% solution in water) | 50 |

Procedure

Same as for Example II, except that Cymel 350 is substituted for the Cymel 7273-7 as the melamine cross-linking agent.

| | |
|---|---|
| NV | 62.8 |
| AV | 26.6 |
| pH | 8.50 |
| GC | 1 |
| Viscosity | Z— |

EXAMPLE V

Charge

| | G. |
|---|---|
| Trimethylol ethane | 169 |
| Phthalic anhydride | 312 |
| Azelaic acid | 248 |
| Neopentyl glycol | 344 |
| Maleinized tall oil (MTO) (Prepared by heating 3:1 ratio of tall oil acids and maleic anhydride for 4-5 hours at 400° F. | 237 |
| Dimethyl ethanol amine | 120 |
| Cymel 7273-7 | 377 |
| Water | 412 |
| n-Propanol | 206 |
| Surfynol PC | 45 |
| p-Tolunee sulfonic acid (5% solution in water) | 47 |

Procedure

Charge TME, PA, NPG and azelaic acid and heat to 390° F. Hold for AV of 30-35 (4-4½ hours). Add MTO and heat to 370° F. Hold for AV of 57-60. Cool and follow same procedure as in Example II.

| | |
|---|---|
| NV | 62.4 |
| AV | 33.2 |
| pH | 8.20 |
| GC | 5 |
| Viscosity | W+ |

It is claimed:

1. A process for the manufacture of a fast-curing, water-soluble, polyester resin base baking vehicle which comprises:
   (i) preparing an aqueous solution of a polyester prepolymer having an acid number of about 30 to 70 and a hydroxyl number of about 75 to 180, and an amount sufficient to adjust the pH of the solution to about 5.5 to 6.5 of a basic nitrogen compound capable of forming a water-soluble soap with said polyester prepolymer;
   (ii) reacting the polyester prepolymer aqueous solution, while initially having the aforementioned pH, at a temperature of about 105 to 140° F. for at least about 15 minutes with cross-linking amounts of an alkylated polymethylol melamine which is soluble in the reaction medium at the reaction temperature, said reaction providing a fast-curing product but insufficient to form a gel; and
   (iii) adjusting the pH of the reaction product solution of (ii) to about 7 to 10 by the addition thereto of a basic nitrogen compound capable of forming a water-soluble soap with said reaction product.

2. The process of claim 1 wherein the alkylated polymethylol melamine contains an average of total alkoxymethyl groups and methylol groups, per molecular proportion of melamine, of about 3 to 6.

3. The process of claim 1 wherein the basic nitrogen compounds of steps (i) and (iii) are selected from the group consisting of ammonia and volatile amines.

4. The process of claim 3 wherein the basic nitrogen compounds of steps (i) and (iii) are volatile tertiary amines.

5. The process of claim 1 wherein in step (ii) the alkylated polymethylol melamine is reacted with the polyester prepolymer in an amount of about 5 to 40 weight percent, based on polyester prepolymer solids.

6. The process of claim 1 wherein the polyester prepolymer is the condensation reaction product of polycarboxylic acid and polyol, at least about 50 weight percent of said polycarboxylic acid having 3 to 5 carboxylic acid groups and at least about 40 weight percent of said polyol having 3 to 6 hydroxyl groups.

7. A process for the manufacture of a fast-curing, water-soluble, polyester resin base baking vehicle which comprises:
(i) preparing an aqueous solution comprising (A) about 70 to 80 parts by weight of polyester prepolymer having an acid number of about 30 to 70 and a hydroxyl number of about 75 to 180, (B) about 30 to 20 parts by weight of water and (C) an amount sufficient to adjust the pH of the solution to about 5.5 to 6.5 of a basic nitrogen compound capable of forming a water-soluble soap with said polyester prepolymer;
(ii) reacting the polyester prepolymer aqueous solution, while initially having the aforementioned pH, at a temperature of about 105 to 140° F. for about 30 to 60 minutes with cross-linking amounts of an alkylated polymethylol melamine, the alkoxy groups of which have 1 to about 4 carbon atoms; and
(iii) adjusting the pH of the reaction product solution of (ii) to about 7 to 10 by the addition thereto of a basic nitrogen compound capable of forming a water-soluble soap with said reaction product.

8. The process of claim 7 wherein the polyester prepolymer is the condensation reaction product of polycarboxylic acid of 4 to 24 carbon atoms and polyol of 2 to 12 carbon atoms, at least about 50 weight percent of said polycarboxylic acid having 3 to 5 carboxylic acid groups and at least about 40 weight percent of said polyol having 3 to 6 hydroxyl groups.

9. The process of claim 8 wherein at least about 50 weight percent of the polycarboxylic acid is trimellitic anhydride and at least about 40 weight percent of said polyol is neopentylglycol.

10. A process for the manufacture of a fast-curing, water-soluble, polyester resin base baking vehicle which comprises:
(i) preparing an aqueous solution comprising (A) about 70 to 80 parts by weight of polyester prepolymer which is the condensation reaction product of polycarboxylic acid and polyol, at least about 50 weight percent of the polycarboxylic acid having 3 to about 5 carboxylic acid groups and at least about 40 weight percent of the polyol having 3 to about 6 hydroxyl groups, said prepolymer having an acid number of about 40 to 60 and a hydroxyl number of about 100 to 160, (B) about 20 to 30 parts by weight of water and (C) an amount sufficient to adjust the pH of the solution to about 6 to 6.5 of a volatile tertiary amine capable of forming a water-soluble soap with said polyester prepolymer;
(ii) reacting said polyester prepolymer aqueous solution, while initially having the aforementioned pH, at a temperature of about 115 to 130° F. for about 30 to 45 minutes with about 15 to 30 weight percent, based on polyester prepolymer solids, of an alkylated polymethylol melamine containing an average of total alkoxymethyl groups and methylol groups, per molecular proportion of melamine, of about 3 to 6, with a preponderance of alkoxymethyl groups, said alkoxy groups having 1 to about 4 carbon atoms; and
(iii) adjusting the pH of the reaction product solution of (ii) to a value of about 8 to 9 by the addition thereto of a volatile tertiary amine capable of forming a water-soluble soap with said reaction product.

11. The process of claim 10 wherein the polycarboxylic acid has 4 to 24 carbon atoms and the polyol has 2 to 12 carbon atoms.

12. The process of claim 11 wherein at least about 50 weight percent of the polycarboxylic acid is trimellitic anhydride.

13. The process of claim 12 wherein at least about 40 weight percent of the polyol is neopentylglycol.

14. The product of the process of claim 1.
15. The product of the process of claim 2.
16. The product of the process of claim 3.
17. The product of the process of claim 4.
18. The product of the process of claim 5.
19. The product of the process of claim 6.
20. The product of the process of claim 7.
21. The product of the process of claim 8.
22. The product of the process of claim 9.
23. The product of the process of claim 10.
24. The product of the process of claim 11.
25. The product of the process of claim 12.
26. The product of the process of claim 13.

References Cited
UNITED STATES PATENTS

| | | | |
|---|---|---|---|
| 2,681,894 | 6/1954 | Hoenel | 260—850 |
| 2,915,486 | 12/1959 | Shelley | 260—21 |
| 3,133,032 | 5/1964 | Jen et al. | 260—21 |
| 3,242,119 | 3/1966 | Ott et al. | 260—29.4 |

JOHN C. BLEUTGE, Primary Examiner

U.S. Cl. X.R.

117—161; 260—21, 32.4, 33.2, 33.4, 850